(12) United States Patent
Rao et al.

(10) Patent No.: US 9,288,227 B2
(45) Date of Patent: Mar. 15, 2016

(54) SYSTEMS AND METHODS FOR TRANSPARENTLY MONITORING NETWORK TRAFFIC FOR DENIAL OF SERVICE ATTACKS

(71) Applicants: Sanjay Rao, Reston, VA (US); Suresh Bhogavilli, Reston, VA (US)

(72) Inventors: Sanjay Rao, Reston, VA (US); Suresh Bhogavilli, Reston, VA (US)

(73) Assignee: VERISIGN, INC., Reston, VA (US)

( * ) Notice: Subject to any disclaimer, the term of this patent is extended or adjusted under 35 U.S.C. 154(b) by 0 days.

(21) Appl. No.: 13/687,841

(22) Filed: Nov. 28, 2012

(65) Prior Publication Data

US 2014/0150094 A1 May 29, 2014

(51) Int. Cl.
H04L 29/06 (2006.01)
(52) U.S. Cl.
CPC ......... *H04L 63/1458* (2013.01); *H04L 63/0281* (2013.01)
(58) Field of Classification Search
CPC .................................................. H04L 63/1458
See application file for complete search history.

(56) References Cited

U.S. PATENT DOCUMENTS

| 6,772,334 | B1 | 8/2004 | Glawitsch | |
|---|---|---|---|---|
| 7,171,683 | B2 | 1/2007 | Pazi et al. | |
| 7,254,133 | B2 * | 8/2007 | Govindarajan et al. | 370/394 |
| 7,404,210 | B2 | 7/2008 | Lin | |
| 7,613,193 | B2 | 11/2009 | Swami et al. | |
| 7,979,694 | B2 | 7/2011 | Touitou et al. | |
| 2005/0021999 | A1 * | 1/2005 | Touitou et al. | 713/200 |
| 2006/0230129 | A1 * | 10/2006 | Swami et al. | 709/223 |
| 2007/0201474 | A1 * | 8/2007 | Isobe | 370/392 |
| 2011/0202972 | A1 | 8/2011 | Jiang | |
| 2012/0227088 | A1 | 9/2012 | Gao | |
| 2013/0031605 | A1 | 1/2013 | Huston, III et al. | |

FOREIGN PATENT DOCUMENTS

WO 2012075866 A1 6/2012

OTHER PUBLICATIONS

Jon Postel, editor, "Transmission Control Protocol DARPA Internet Program Protocol Specification", Sep. 1981, prepared for: Defense, Advanced Research Projects Agency Information Processing Techniques Office, Arlington, VA, by: Information Sciences Institute University of Southern California, Marina del Rey, CA, 80 pages.
Changhua Sun et al., "A Robust Scheme to Detect SYN Flooding Attacks," China Com '07, 2007, 6 pages.
Humphrey Waita Njogu et al., "Combating TCP Based Attacks on Mobile Devices," Proceedings—International Conference on Computer and Software Engineering, CSEE2008 vol. 3, 6 pages.
Extended European Search Report dated Apr. 9, 2014, issued in European Application No. 13193758.3 filed on Nov. 21, 2013, pp. 1-10.

\* cited by examiner

*Primary Examiner* — Jeffrey Pwu
*Assistant Examiner* — Wasika Nipa
(74) *Attorney, Agent, or Firm* — MH2 Technology Law Group, LLP

(57) ABSTRACT

A mitigation service can monitor network traffic in one direction between a client computer and a server computer. The mitigation service can receive a request from a client computer to establish a network connection with a server computer. The mitigation service can reply to the client computer with an acknowledgment that is configured to cause the client computer to issue a request to reset the connection. The acknowledgement is configured not to affect the establishment of the network connection with the server computer. The mitigation service can compare the details of the reset request with the request to establish the network connection. If the details match, the mitigation service can forward the request to establish the network connection to the server computer.

25 Claims, 9 Drawing Sheets

SYSTEMS AND METHODS FOR TRANSPARENTLY MONITORING NETWORK TRAFFIC FOR DENIAL OF SERVICE ATTACKS

FIELD

This disclosure relates generally to network security.

BACKGROUND

Network security is an important factor in today's networking environment. One current method of attacking a computer network is a distributed denial of service attack (DDoS). In a DDoS attack, malicious agents attempt to overload server computers of an entity by bombarding the server computers with traffic. One type of DDoS attack is a connection request attack. In a connection request attack, one or more malicious system attempt to overload server computers by "flooding" the server computers with bogus connection requests. For example, one such attack is a transport connection protocol (TCP) synchronization (SYN) flood attack. In a SYN flood attack, server computers are overloaded with SYN requests to establish bogus TCP connections.

The most commonly used method to mitigate SYN flood attacks is to use SYN cookies. In this method, a mitigation system, which is located between client computers and server computers, sends synchronization-acknowledgment (SYN-ACK) communications on behalf of a server computer that it is protecting in response to a SYN request. The mitigation system proposes an initial SYN sequence number that is representative of the connection state. If the client computer responds with an ACK segment, the connection is validated by regenerating the initial state and by decompressing the acknowledgment (ACK) sequence. The mitigation system then opens a TCP connection to the server computer that it is protecting. The mitigation system then translates the sequence number between the two connections as the initial sequence numbers proposed by the mitigation system to the client computer will be different from that proposed by the server computer to the mitigation system. This imposes a restriction that the mitigation system must see traffic in both directions i.e., traffic from the client computer to the server computer and traffic from the server computer to the client computer. In cases where traffic from the server computer takes a different route to reach the client computer, this method does not work.

Accordingly, there is a need for methods and systems that mitigate network attacks without seeing the network traffic in both directions.

SUMMARY

Implementations of the present teachings relate to computer-implemented methods for monitoring network connections by a mitigation service. The mitigation service monitoring network traffic in one direction between a client computer and a server computer. The methods include receiving, from the client computer, a connection request that is configured to establish a network connection between the client computer and the server computer. The connection request comprises at least one parameter corresponding to the network connection. The methods also include sending, to the client computer, a response that is configured to cause a reply by the client computer. The response does not interrupt the establishment of the network connection between the client computer and the server computer and does not complete the establishment of the network connection between the client computer and the server computer. Further, the methods include determining whether the reply is received from the client computer. Additionally, the methods include, in response to determining that the reply is received from the client computer, sending the connection request to the server computer without altering an identification of the client computer in the request.

Implementations of the present teachings also relate to computer-implemented methods for monitoring network traffic by a mitigation service. The mitigation service monitoring network traffic in one direction between a client computer and a server computer. The methods include receiving, from the client computer, a TCP synchronization (SYN) packet that is configured to establish a TCP connection with the server computer. The TCP SYN packet comprises one or more parameters corresponding to the TCP connection. The methods also include determining a network address corresponding to the client computer. Additionally, the methods include sending, to the client computer, a TCP acknowledgement (ACK) packet. The TCP ACK is configured to initiate a reply by the client computer without interrupting the establishment of the TCP connection with the server computer and does not complete the establishment of the TCP connection between the client computer and the server computer. Further, the methods include receiving a TCP reset (RST) packet, wherein the TCP RST packet comprises one or more parameters and determining an origination network address corresponding to the TCP RST packet. The methods also include comparing the origination network address and at least one of the one or more parameters of the TCP RST packet respectively to the network address corresponding to the client computer and at least one of the parameters corresponding to the TCP connection of the TCP SYN packet. The methods include determining whether the TCP RST packet originated from the client computer based on the comparison. Additionally, the methods include, in response to determining that the TCP RST packet originated from the client computer, sending the TCP SYN packet to the server computer without altering an identification of the client computer in the TCP SYN.

Implementations of the present teachings also relate to computer-implemented methods for monitoring network traffic by a mitigation service. The mitigation service monitoring network traffic in one direction between a client computer and a server computer. The methods include receiving, from the client computer, a TCP synchronization (SYN) packet that is configured to establish a TCP connection with the server computer. The TCP SYN packet comprises one or more parameters corresponding to the TCP connection. The methods also include determining a network address corresponding to the client computer. Additionally, the methods include sending, to the client computer, a TCP acknowledgement (ACK) packet. The TCP ACK is configured to initiate a reply by the client computer without interrupting the establishment of the TCP connection with the server computer and does not complete the establishment of the TCP connection between the client computer and the server computer. The methods also include receiving a TCP reset (RST) packet. The TCP RST packet comprises one or more parameters. Further, the methods include determining an origination network address corresponding to the TCP RST packet. The methods include comparing the origination network address and at least one of the one or more parameters of the TCP RST packet respectively to the network address corresponding to the client computer and at least one of the parameters corresponding to the TCP connection of the TCP SYN packet. The methods also include determining whether the TCP RST packet originated from the client computer based on the comparison. Further, the methods include, in response to determining that the TCP RST packet originated from the client computer, sending the TCP SYN packet to the server computer without altering an identification of the client computer in the TCP SYN.

Implementations of the present teachings also relate to computer readable storage media storing instructions. The Instructions cause one or more processor to perform methods for monitoring network connections by a mitigation service. The mitigation service monitoring network traffic in one direction between a client computer and a server computer. The methods include receiving, from the client computer, a connection request that is configured to establish a network connection between the client computer and the server computer. The connection request comprises at least one parameter corresponding to the network connection. The methods also include sending, to the client computer, a response that is configured to cause a reply by the client computer. The response does not interrupt the establishment of the network connection between the client computer and the server computer and does not complete the establishment of the network connection between the client computer and the server computer. Further, the methods include determining whether the reply is received from the client computer. Additionally, the methods include, in response to determining that the reply is received from the client computer, sending the connection request to the server computer without altering an identification of the client computer in the request.

Implementations of the present teachings also relate devices for monitoring network traffic in one direction between a client computer and a server computer. The devices include one or more memory devices storing instructions, and one or more processors coupled to the one or more memory devices. The one or more processors are configured to execute the instructions to perform methods. The methods include receiving, from the client computer, a connection request that is configured to establish a network connection between the client computer and the server computer. The connection request comprises at least one parameter corresponding to the network connection. The methods also include sending, to the client computer, a response that is configured to cause a reply by the client computer. The response does not interrupt the establishment of the network connection between the client computer and the server computes and does not complete the establishment of the network connection between the client computer and the server computer. Further, the methods include determining whether the reply is received from the client computer. Additionally, the methods include, in response to determining that the reply is received from the client computer, sending the connection request to the server computer without altering an identification of the client computer in the request.

BRIEF DESCRIPTION OF THE DRAWINGS

Various features of the implementations can be more fully appreciated, as the same become better understood with reference to the following detailed description of the implementations when considered in connection with the accompanying figures, in which.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Electrical, mechanical, logical and structural changes can be made to the examples of the various implementations without departing from the spirit and scope of the present teachings. The following detailed description is, therefore, not to be taken in a limiting sense and the scope of the present teachings is defined by the appended claims and their equivalents.

Implementations of the present teachings relate to systems and methods for monitoring and protecting network connections. In particular, a mitigation service can monitor network traffic in one direction between a client computer and a server computer. The mitigation service can receive a request from a client computer to establish a network connection with a server computer. The mitigation service can reply to the client computer with an acknowledgment that is configured to cause the client computer to issue a request to reset the connection. The acknowledgement is configured not to affect the establishment of the network connection with the server computer. Once the mitigation service receives the reset request, the mitigation service can compare the details of the reset request with the request to establish the network connection. If the details match, the mitigation service can forward the request to establish the network connection to the server computer.

According to implementations, the mitigation service can transparently protect the server computers thereby leaving a state of the connection with the client and server end-to-end without the mitigation server doing sequence number translations. Moreover, the mitigation service can be deployed in a low bandwidth client to server path that is typical of today's Internet and the high bandwidth server to client path can bypass the mitigation service. The mitigation service can also enable in-the-cloud mitigation services.

Figure 1:
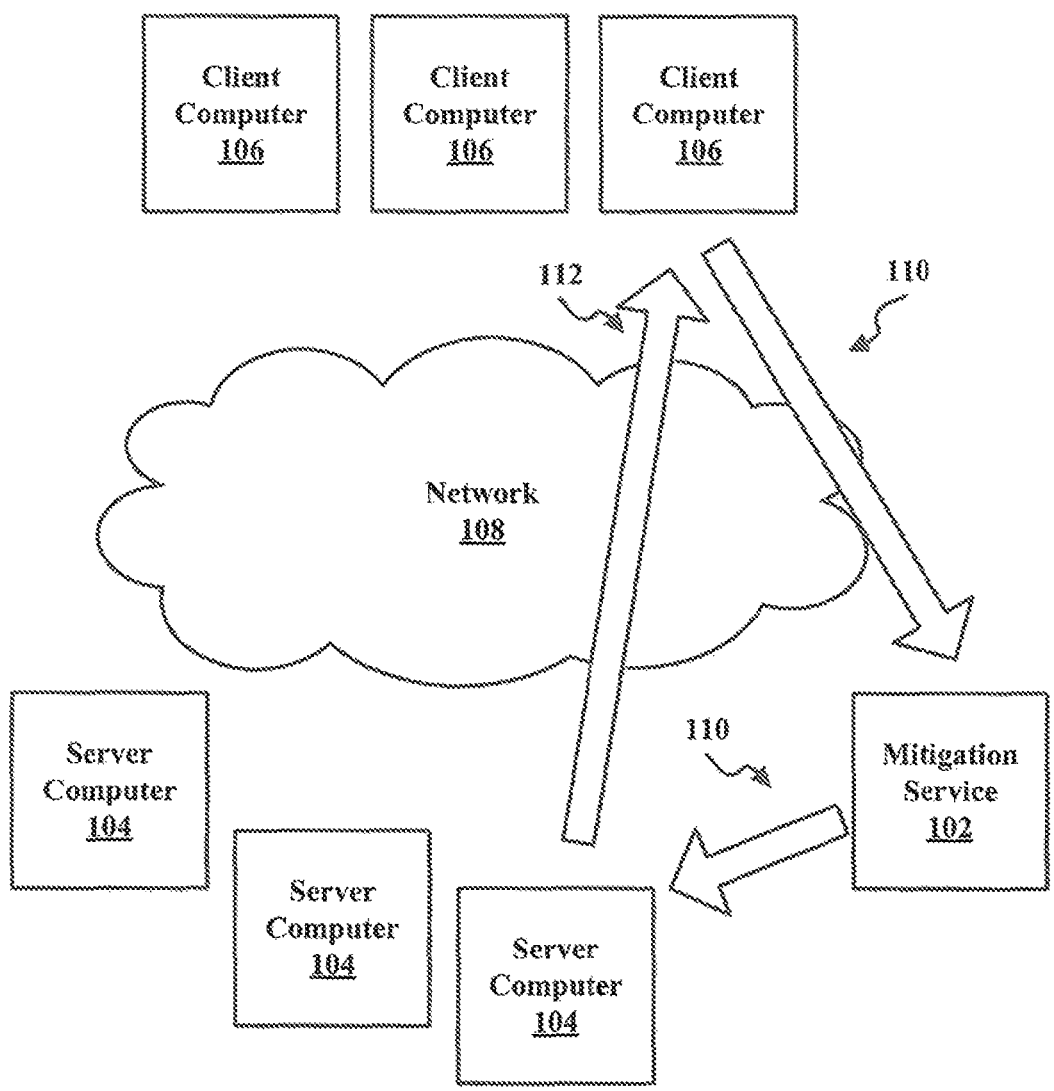
FIG. 1 is a generic block diagram, of an environment in which a mitigation service can monitor network traffic in one direction, according to various implementations.

FIG. 1 illustrates an example of an environment 100 in which a mitigation service 102 can monitor network traffic with one or more server computers 104, according to various embodiments. While FIG. 1 illustrates various components contained in and related to the environment 100. FIG. 1 is one example of a computer networking environment and additional components can be added and existing components can be removed.

As illustrated in FIG. 1, the mitigation service 102 can be configured to monitor network traffic 110 in one direction between one or more client computers 106 and the server computers 104. In particular, the network traffic 110 that originates with the client computers 106 and is intended for the server computers 104 can be redirected though the mitigation service 102. In implementations, the mitigation service 102 can be configured to verify that the traffic 110 is legitimate while only seeing traffic, in one direction, between the client computers 106 and the server computers 104. In implementations, the mitigation service 102 can be configured to verify that the network connections are proper as discussed below. If determined to be proper, the mitigation service 102 can be configured to forward the network traffic 110 to the server computers 104 on behalf of the client computer 106. The mitigation service 102 can be configured to verify the connection requests of the network traffic 110 while only seeing traffic between the client computers 106 and the computers in one direction. As such, the server computers 104 can communicate with the client computers 106 using other communication channels 112 over the network 108.

The server computers 104 can be configured to communicate with the client computers 106 to provide services, content, and the like to the client computers 106. The server computers 104 can be any type of conventional computer device that includes hardware components (e.g., one or more processors, one or more memory devices, one or more storage devices, one or more network interface devices, one or more input/output devices, etc.) and software components (e.g., one or more operating system, one or more application programs, etc.) The server computers 104 can be configured to communicate with the client computers 106 using any type of communications protocols over the network 108 such as hypertext transfer protocol (HTTP), TCP, and Internet protocol (IP). For example, the server computers 104 can include, for example, web servers that service HTTP requests from the client computers 106 for web pages hosted by web servers. In this example, HTTP requests from the client computers 106 can be encapsulated in TCP segments, IP datagrams, and Ethernet frames and transmitted to the server computers 104.

The network 108 can include one or more local area networks and/or wide area networks, whether public or private. For example, the network 108 can Include the Internet and any local area networks and wide area networks that the client computers 106 and the server computers 104 utilize in order to connect to the Internet. The client computers 106 can be configured to allow a user to request services, content, and the like from, the server computers 104. The client computers 106 can be any type of conventional computer device that includes hardware components (e.g., one or more processors, one or more memory devices, one or more storage devices, one or more network interface devices, one or more input/output devices, etc.) and software components (e.g., one or more operating system, one or more application programs, etc.) For example, the client computers 106 can include, for example, desktop computers, laptop computers, tablet computers, thin client computers, smart phones, and the like.

The mitigation service 102 can be implemented as a software program that is capable of being executed by any type of computer system. In implementations, the mitigation server 102 can be stored and executed by a computer system that is separate font the server computers 104. Likewise, in implementations, the mitigation, service 102 can be stored and executed on the sewer computers 104. The mitigation service 102 can be a stand-alone software program and/or can be a program module that can be a component of another software program. The mitigation service 102 can be written in a variety of programming languages, such as Ruby, JAVA, C++, Python code, Visual Basic, hypertext markup language (HTML), extensible markup language (XML), and the like to accommodate a variety of operating systems, computing system architectures, etc.

Figure 2:
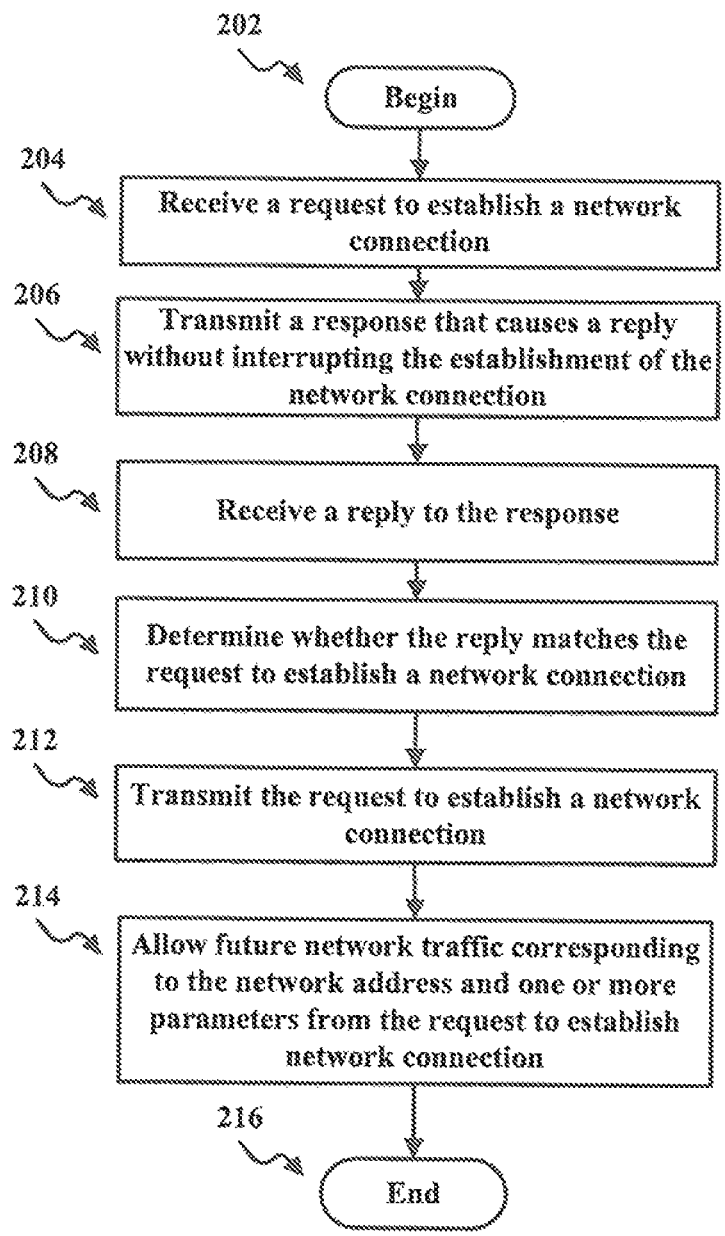
FIG. 2 is a flow diagram, of an example of a process for monitoring network traffic, according to various implementations.
Figure 3:
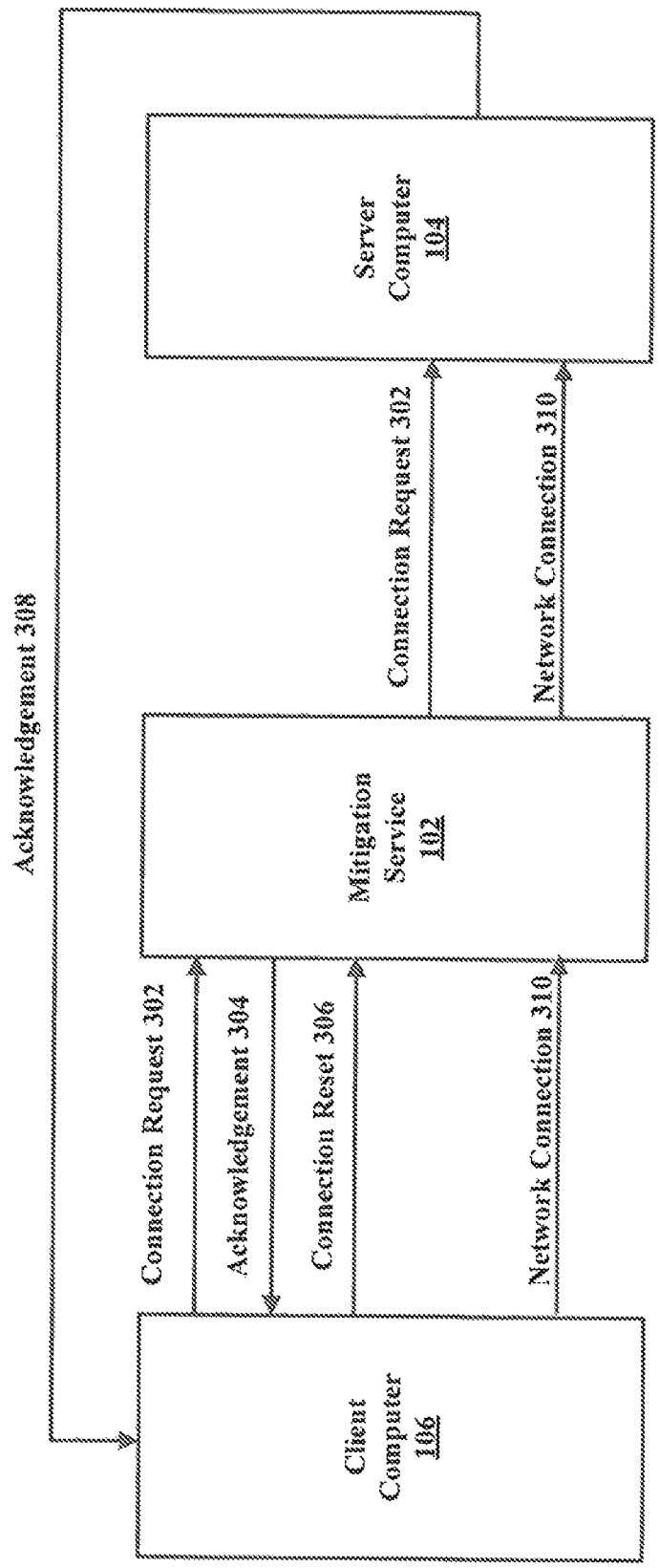
FIG. 3 is a generic block diagram of example communications traffic during the process of FIG. 2, according to various implementations.

In implementations, the mitigation service 102 can be configured to monitor the network traffic bound for the server computers 104 to identity any potential attacks on the server computers 104. For example, the mitigation service 102 can be configured to monitor the network traffic for a denial of service (DoS) attack. A DoS attack can refer to a traditional DoS attack, in which all malicious requests or communications originate from a single device, a DDoS attack, in which multiple, separate devices may participate in the attack, or other types of cyber attacks. FIGS. 2 and 3 illustrate one example of a process performed by the mitigation service 102 to monitor network traffic, according to various implementations. While FIGS. 2 and 3 illustrate various processes and stages that can be performed by the mitigation service 102, any of the processes and stages of the processes cart be performed by any component of the environment 100. Likewise, the illustrated stages of the processes are examples and that any of the illustrated stages can be removed, additional stages can be added, and the order of the illustrated stages can be changed.

In 202, the process can begin. In 204, the mitigation service 102 can receive a request to establish a network connection. For example, as illustrated in FIG. 3, the client computer 106 can transmit a connection request 302 that is hound for the server computer 104. The mitigation service 102 can intercept the connection request 302 from the client computer 106 that is bound for the server computer 104. The connection request 302 can be any conventional, request to establish a network connection utilizing any type of conventional network protocols. The connection request 302 can include parameters necessary to establish a network connection between the client computer 106 and the server computer 104. The parameters can include network address of the client computer 106, sequence number of the connection request 302, port number for the network connection, time to live (TTL) for the connection request 302, and the like.

In 206, die mitigation, service 102 can transmit a response that causes a reply by the client computer 106 without interrupting the establishment of the network connection and without completing the establishment of the network connection. The response can be configured to cause the client computer 106 to respond with a reply. While causing the client computer 106 to reply, the response does not cause the client computer 106 to interrupt the establishment of the network connection i.e., the client computer 106 does not attempt anew connection with the server computer 104. For example, as illustrated in FIG. 3, the mitigation service 102 can transmit an acknowledgment 304 to the client computer 106. The acknowledgment 304 can include parameters that are included in the connection request 302, but cause the client computer 106 to initiate a connection reset, but does not interrupt the establishment of the network connection with the server computer 104. For example, the acknowledgement 304 can include the same sequence number as the connection request 302 or an out-of-date time stamp.

In 208, the mitigation service 102 can receive a reply from the client computer 106. For example, as illustrated in FIG. 3, the mitigation service 102 can receive from the client computer 106 a connection reset 306. The connection reset 306 can include one or more of the parameters that were included in the acknowledgment 304. For example, when the client computer 106 receives the acknowledgment 304 with the same sequence number as the connection request 302 or an out-of-date time stamp, the client computer 106 assumes that the response corresponds to a stale or out-of-sequence network connection. Accordingly, the client computer 106 responds with a connection reset 306 with the one or more parameters in the acknowledgment 304 it assumes is stale or out-of-sequence network connection.

In 210, the mitigation service 102 can determine whether the reply matches the request to establish a network connection. For example, the mitigation service 102 can compare the network address and one or more of the parameters corresponding to the connection reset 306 to the network address and one or more of the parameters corresponding to the connection request 302.

In 212, if the requests match, the mitigation service 102 can transmit the request to establish a network connection. For example, as illustrated in FIG. 3, the mitigation service 102 can transmit the connection request 302 to the server computer 104. The mitigation service 102 can generate the connection request 302 based on the parameters received in the connection request 302 or the connection rest 306. Likewise, the mitigation service 102 can wait until the client computer 106 re-transmits the connection request 302 and then transmit the connection request 302 to the server computer 104.

Once the server computer 104 receives the connection request 302, the server computer 104 can transmit an acknowledgment 308. As illustrated in FIG. 3, the server computer 104 can transmit the acknowledgment 308 through a separate network pathway that does not include the mitigation service 102.

In 214, the mitigation service 102 can allow future network traffic corresponding to network address and one or more parameters from the request to establish the network connection. For example, as illustrated in FIG. 3, once the client computer 106 receives the acknowledgment 308, the client computer 106 can send an acknowledgement to the server computer 104. Because the mitigation service 102 has verified the client computer 106, the mitigation service 102 can allow the traffic between the client computer 106 and the server computer 104 thereby establishing the network connection 310. In 216, the process can end, repeat, or return to any point.

Figure 4:
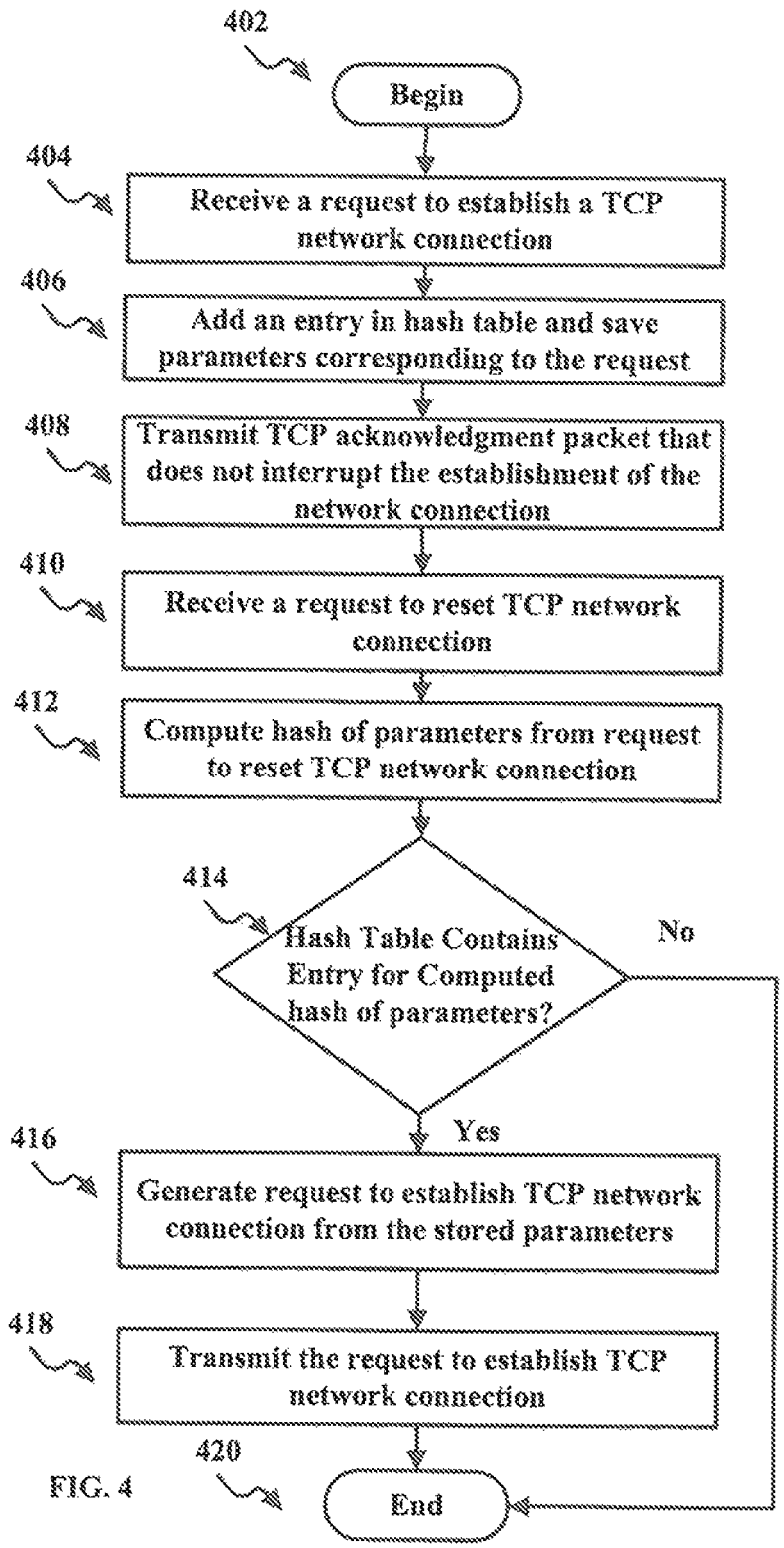
FIG. 4 is a flow diagram of an example of a process for monitoring TCP network traffic, according to various implementations.
Figure 5:
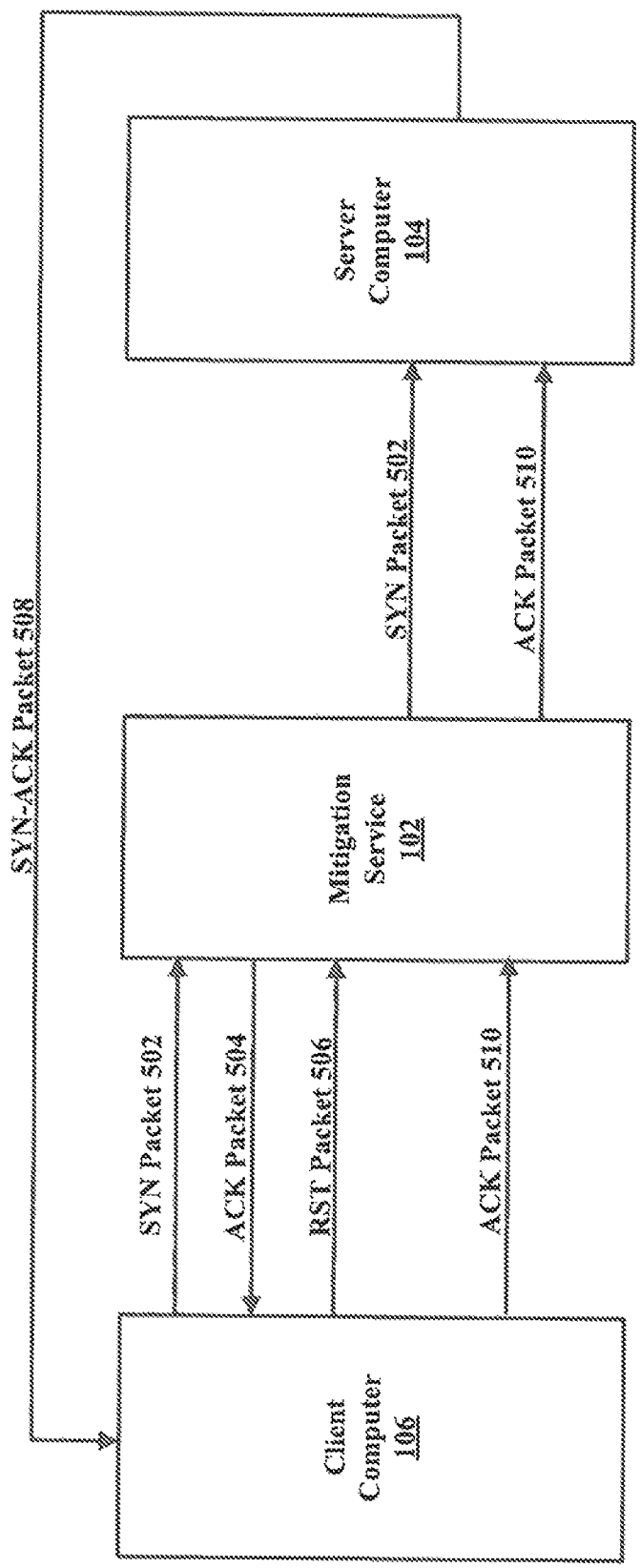
FIG. 5 is a generic block diagram of example TCP communications traffic during the process of FIG. 4, according to various implementations.

As mentioned above, the mitigation service 102 can be configured to monitor network connections that utilize any type of conventional network protocols. In implementations, the mitigation service 102 can be configured to monitor TCP network connections between the client computers 106 and the server computers 104. FIGS. 4 and 5 illustrate one example of a process performed by the mitigation service 102 to monitor TCP network traffic, according to various implementations. While FIGS. 4 and 5 illustrate various processes and stages that can be performed by the mitigation service 102, any of the processes and stages of the processes can be performed by any component of the environment 100. Likewise, the illustrated stages of the processes are examples and that any of the illustrated stages can be removed, additional stages can be added, and the order of the illustrated stages can be changed.

In 402, the process can begin. In 404, the mitigation service 102 can receive a request to establish a TCP network connection. For example, as illustrated in FIG. 5, the client computer 106 can transmit a TCP SYN packet 502 that is bound for the server computer 104. The mitigation service 102 can intercept the TCP SYN packet 502 from the client computer 106 that is bound for the server computer 104. The TCP SYN packet 502 can include parameters necessary to establish the TCP network connection between the client computer 106 and the server computer 104. The parameters can include network address of the client computer 106, sequence number of the TCP SYN packet 502, port number for the network connection, TTL for the TCP SYN packet 502, and the like.

In 406, the mitigation service 102 can add an entry in hash table and save parameters corresponding to the request. The mitigation service 102 maintains a record of the parameters of TCP traffic received by the mitigation service. For example, the mitigation service 102 can store network address of the client computer 106, sequence number of the TCP SYN packet 502, port number for the network connection, TTL for the TCP SYN packet 502, and the like. The mitigation service 102 can utilize the hash table as an index for easily determining whether a record exists for particular parameters of TCP traffic. To create an entry in the hash table, the mitigation service can apply a hash function to one or more parameters received in the TCP SYN packet 502. For example, the mitigation service 102 can apply a hash function to the network address of the client computer 106 corresponding to the TCP SYN 502 and the TTL corresponding to the TCP SYN 502. The mitigation service 102 can utilize any type of conventional hash function or algorithm.

In 408, the mitigation service 103 can transmit TCP acknowledgment packet to the client computer 106 that does not interrupt the establishment of the TCP network connection and that does not complete the establishment of the TCP network connection. The TCP acknowledgment packet can be configured to cause the client computer 106 to respond with a TCP RST packet. While causing the client computer 106 to reply with a TCP RST packet, the TCP acknowledgment packet does not cause the client computer 106 to interrupt the establishment of the TCP network connection i.e., the client computer 106 does not attempt a new connection with the server computer 104. For example, as illustrated in FIG. 5, the mitigation service 102 can transmit a TCP ACK packet 504 to the client computer 106. The TCP ACK packet 504 can include parameters that are included in the TCP SYN packet 502. The parameters cause the client computer 106 to initiate a connection reset, but do not interrupt the establishment of the TCP network connection with the server computer 104. For example, the TCP ACK packet 504 can include the same sequence number as the TCP SYN packet 502 or an out-of-date time stamp.

In 410, the mitigation service 102 can receive a request to reset TCP network connection. For example, as illustrated in FIG. 5, the mitigation service 102 can receive from the client computer 106 a TCP RST packet 506. The TCP RST packet 506 can include one or more of the parameters that were included in the TCP ACK packet 504. For example, when the client computer 106 receives the TCP ACK packet 504 with the same sequence number as the TCP SYN packet 502 or an out-of-date time stamp, the client computer 106 assumes that the TCP ACK packet 504 is a stale or out-of-sequence network connection. That is, in the case of the same sequence number, the client computer 106 expects the sequence number of TCP ACK packet 504 to be one more than the sequence number of the TCP SYN packet 502, so it considers the TCP ACK packet 504 with the same sequence number to be a stale packet. Accordingly, the client computer 106 responds with TCP RST packet 506 with the one or more parameters that were included in the TCP ACK packet 504 that it assumes is stale or out-of-sequence network connection.

In 412, the mitigation service 102 can compute a hash of parameters from request to reset TCP network connection. For example, the mitigation service 102 can compute a hash of the one or more parameters, for instance the network address and the TTL, corresponding to the TCP RST packet 506. The mitigation service 102 can utilize the same hash function used to generate the hash table entries in order to compute the hash. In 414, the mitigation service 102 can determine whether the hash table contains an entry for computed hash of parameters. For example, the mitigation service 102 can compare the computed hash of the parameters from the TCP RST packet 506 to the hash table. If a match is found, the mitigation service 102 can determine that the TCP RST packet 506 corresponds to the TCP SYN packet 502 received from, the client computer 306.

In 416, the mitigation service 102 can generate request to establish TCP network connection from the stored parameters. For example, alter the mitigation service 102 determines an entry exists in tire hash table that matches the TCP RST packet 506, the mitigation service 102 can retrieve the stored, parameters corresponding to the TCP SYN packet 502. Using the stored parameters, the mitigation service 102 can generate a new TCP SYN 502 in order to allow the TCP connection, between the client computer 106 and the server computer 104.

In 418, the mitigation service 102 can transmit the request to establish TCP network connection to the server computer 106. For example, as illustrated in FIG. 5, the mitigation service 102 can transmit generated TCP SYN packet 502 to the server computer 104. In response, the server computer 104 can transmit a TCP SYN-ACK packet 508 to the client computer 106. Because the mitigation service 102 only need to monitor TCP traffic in one direction, the server computer 104 can transmit the TCP SYN-ACK packet 508 through other pathways. Once received, the client computer 106 can transmit an ACK packet 510 to the server computer 104 that finalizes the TCP connection. Because the mitigation service 102 has verified the client computer 106, the mitigation service 102 can send the ACK packet 510 to the server computer 104. In 420, the process can end, repeat, or return to any point.

In the process described above, the mitigation service 102 can maintain any number of hash tables to efficient record and locate stored parameters corresponding to TCP SYN packets. In one example, the mitigation service 102 can maintain four hash tables. At any given time two hash tables corresponding to current time, t, and time, t−1, can be considered active. The other two hash tables can be candidates to be cleaned. When a TCP RST packet arrives, the first active hash table corresponding to current time, t, can be searched for a corresponding SYN entry. If a SYN entry is not found, the other active hash table corresponding to time, t−1, can be searched. If found, the mitigation service 102 can mark the TCP EST packet as valid in response to a previous SYN packet and perform the process described above. When a SYN packet arrives, the mitigation service 102 can create an entry hash table corresponding to current time, t. If for some reason time task lags behind in cleaning or clearing task, all SYN packets can be dropped and other packets are let through.

Figure 6:
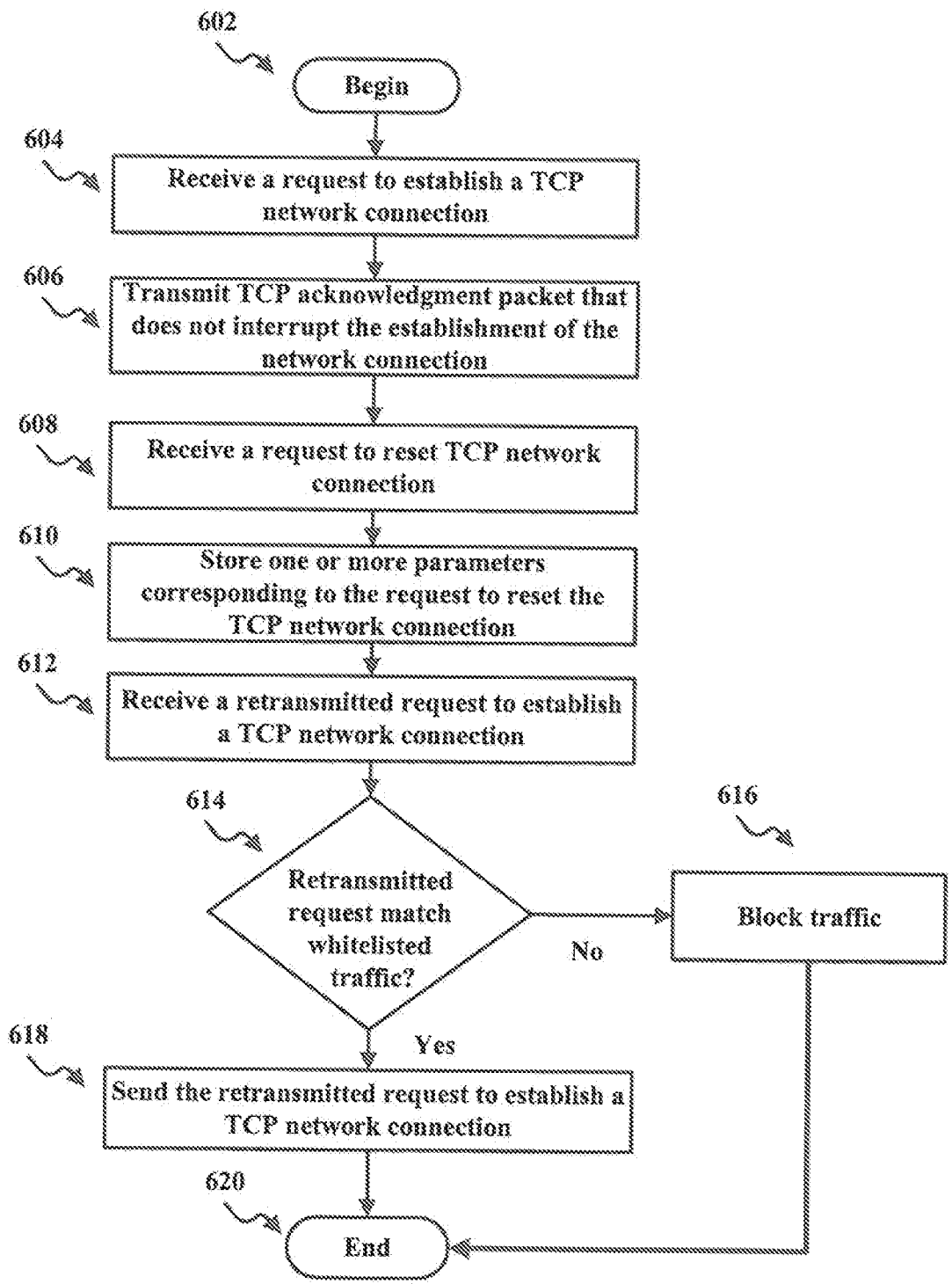
FIG. 6 is a flow diagram of an example of another process for monitoring TCP network traffic, according to various implementations.
Figure 7:
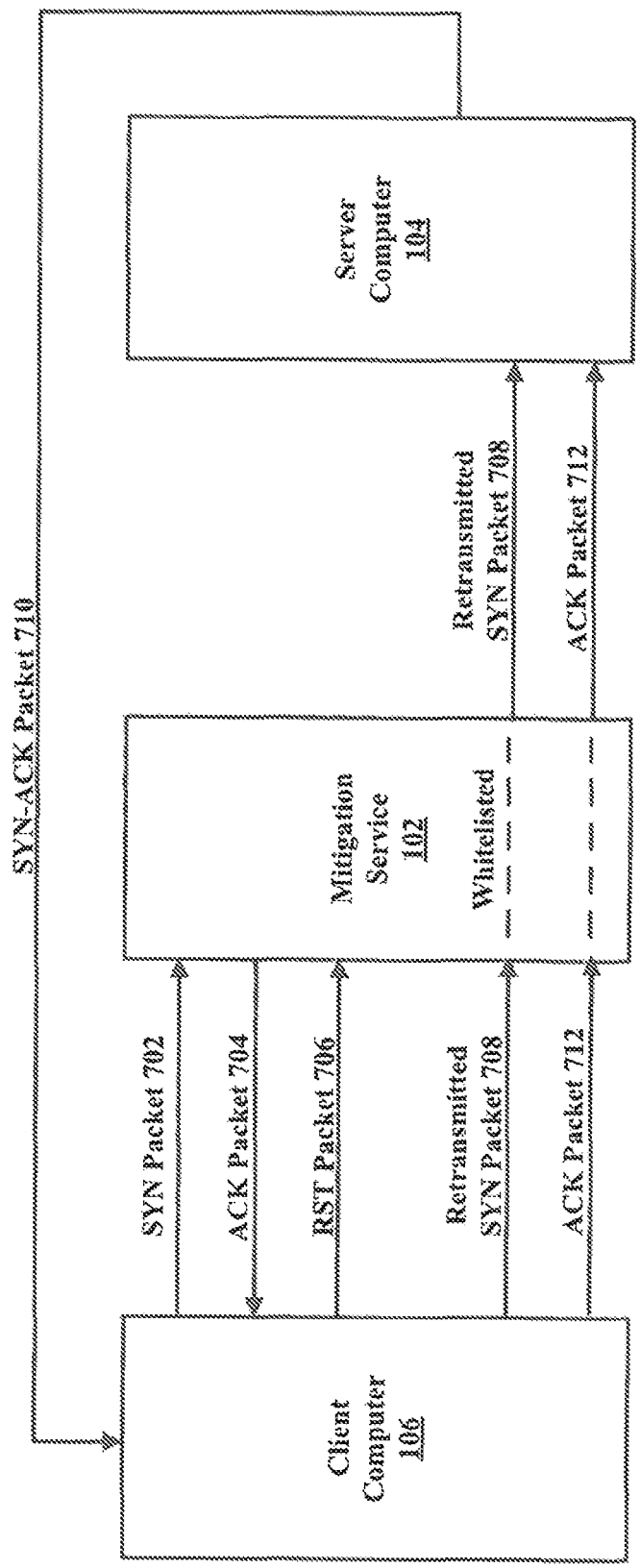
FIG. 7 is a generic block diagram of example TCP communications traffic during the process of FIG. 6, according to various implementations.

FIGS. 6 and 7 illustrate another example of a process performed by the mitigation service 102 to monitor TCP network traffic, according to various implementations. While FIGS. 6 and 7 illustrate various processes and stages that can be performed by the mitigation service 102, any of the processes and stages of the processes can be performed by any component of the environment 100. Likewise, the illustrated stages of the processes are examples and that any of the illustrated stages can be removed, additional stages can be added, and the order of the illustrated stages can be changed.

In 602, the process can begin. In 604, the mitigation service 102 can receive a request to establish a TCP network, connection. For example, as illustrated in FIG. 7, the client computer 106 can transmit a TCP SYN packet 702 that is bound for the server computer 104. The mitigation service 102 can intercept the TCP SYN packet 702 from the client computer 106 that is bound for the server computer 104. The TCP SYN packet 702 can include parameters necessary to establish the TCP network connection between the client computer 106 and the server computer 104. The parameters can include network address of the client computer 106, sequence number of the TCP SYN packet 702, port number for the network connection, TTL for the TCP SYN packet 702, and the like.

In 606, the mitigation service 102 can transmit TCP acknowledgment packet to the client computer 106 that does not interrupt the establishment of the TCP network connection, and that does not complete the establishment of the TCP network connection. The TCP acknowledgment packet can be configured to cause the client computer 106 to respond with a TCP EST packet. While causing the client computer 106 to reply with a TCP RST packet, the TCP acknowledgment packet, does not cause the client computer 106 to interrupt the establishment of the TCP network connection i.e., the client computer 106 does not attempt a new connection with the sewer computer 104. For example, as illustrated in FIG. 7, the mitigation service 102 can transmit a TCP ACK packet 704 to the client computer 106. The TCP ACK packet 704 can include parameters that are included in the TCP SYN packet 702. The parameters cause the client computer 106 to initiate a connection reset, but do not interrupt the establishment of the TCP network connection with the server computer 104. For example, the TCP ACK packet 704 can include the same sequence number as the TCP SYN packet 702 or an out-of-date time stamp.

In 608, the mitigation service 102 can receive a request to reset TCP network connection. For example, as illustrated in FIG. 7, the mitigation service 102 can receive from the client computer 106 a TCP RST packet 706. The TCP RST packet 706 can include one or more of the parameters that were included in the TCP ACK packet 704. For example, when the client computer 106 receives the TCP ACK packet 704 with, the same sequence number as the TCP SYN packet 702 or an out-of-date time stamp, the client computer 106 assumes that the TCP ACK packet 704 is a stale or out-of-sequence network connection. That is, in the case of the same sequence number, the client computer 106 expects the sequence number of TCP ACK packet 704 to be one more than the sequence number of the TCP SYN packet 702, so it considers the TCP ACK packet 704 with the same sequence number to be a stale packet. Accordingly, the client computer 106 responds with TCP RST packet 706 with the one or more parameters that were included in the TCP ACK packet 704 it assumes is stale or out-of-sequence network connection.

In 610, the mitigation service 102 can store one or more parameters corresponding to the request to reset the TCP network connection. For example, the mitigation service 102 can store the one or more parameters that correspond to TCP RST packet 706. The parameters can include the network address of the client computer 106, sequence number of the TCP RST packet 706, port number for the network connection, TTL for the TCP RST packet 706, and the like. Once stored, the mitigation service 102 can, in effect, whitelist (allow) all TCP traffic that includes parameters that match the stored parameters. The mitigation service 102 can continue to whitelist the TCP traffic for a predetermined amount of time. This predetermined amount of time can be based on an amount of time reasonable to maintain security of the server computers 104, for example 20 minutes.

Additionally, the mitigation service 102 can blacklist (block) TCP traffic that includes parameters that match some of the stored parameters but not all parameters. For example, the mitigation service 102 can blacklist TCP traffic that includes a network address which matches a stored network address, but includes other parameters (e.g., TTL) which do not correspond to the stored parameters associated with the stored network address. The mitigation service 102 can continue to block the TCP traffic for a predetermined amount of time. This predetermined amount of time can be based on an amount of time reasonable to maintain security of the server computers 104. The predetermined amount of time can match the whitelist predetermined amount of time or can be different.

In 612, the mitigation service 102 can receive a retransmitted request to establish a TCP network connection. For example, as illustrated in FIG. 7, after not receiving an acknowledgement from the server computer 104, the client computer 106 can retransmit the original TCP SYN packet 702 as TCP SYN packet 708. The TCP SYN packet 708 can include the same parameters as the original TCP SYN packet 702.

In 614, the mitigation service 102 can determine whether the retransmitted request to establish a TCP network connection matches traffic previously whitelisted. The mitigation service 102 can compare the parameters corresponding to the retransmitted request to establish a TCP network connection to the parameters previously stored. For example, the mitigation service 102 can compare the parameters of the TCP SYN packet 708 to the parameters that were previously stored.

If the retransmitted request to establish a TCP network connection does not match, in 616 the mitigation service 102 can block the request. If the retransmitted request to establish a TCP network connection matches, in 618, the mitigation service 102 can send the retransmitted request to establish a TCP network connection. For example, as illustrated in FIG. 7, the mitigation service 102 can send the SYN packet 708 to the server computer 104. In response, the server computer 104 can transmit a TCP SYN-ACK packet 710 to the client computer 106. Because the mitigation service 102 only need to monitor TCP traffic in one direction, the server computer 104 can transmit the TCP SYN-ACK packet 710 through other pathways. Once received, the client computer 106 can transmit an ACK packet 712 to the server computer 104 that finalizes the TCP connection. Because the mitigation service 102 has white-listed the client computer 106, the mitigation service 102 can send the ACK packet 712 to the server computer 104.

Because the mitigation service whitelists TCP traffic from the client computer for a predetermined amount of time, the mitigation service 102 will continue sending new SYN packets for new TCP network connections to the server computer 104 as described above in 614-618. Once the predetermined amount of time expires, the mitigation service 102 will process any new TCP SYN packet from the client computer 106 from the beginning at 602. In 620, the process can end, repeat, or return to any point.

In implementations, the mitigation service 102 can monitor network traffic, in one direction, over time. The mitigation service 102 can maintain a history of requests for network connection from the client computers 106. If mitigation service 102 determines that the number of requests from a client computer 106 or a group of client computer 106 exceeds a predetermined threshold, the mitigation service 102 can determine that the server computers 104 are under a DoS or DDoS attack. The predetermined threshold can be any number of requests for network connection in an amount of time that suggests a DoS or DDoS attack. In response, the mitigation service 102 can alter the processes for monitoring and preventing network attacks.

Figure 8:
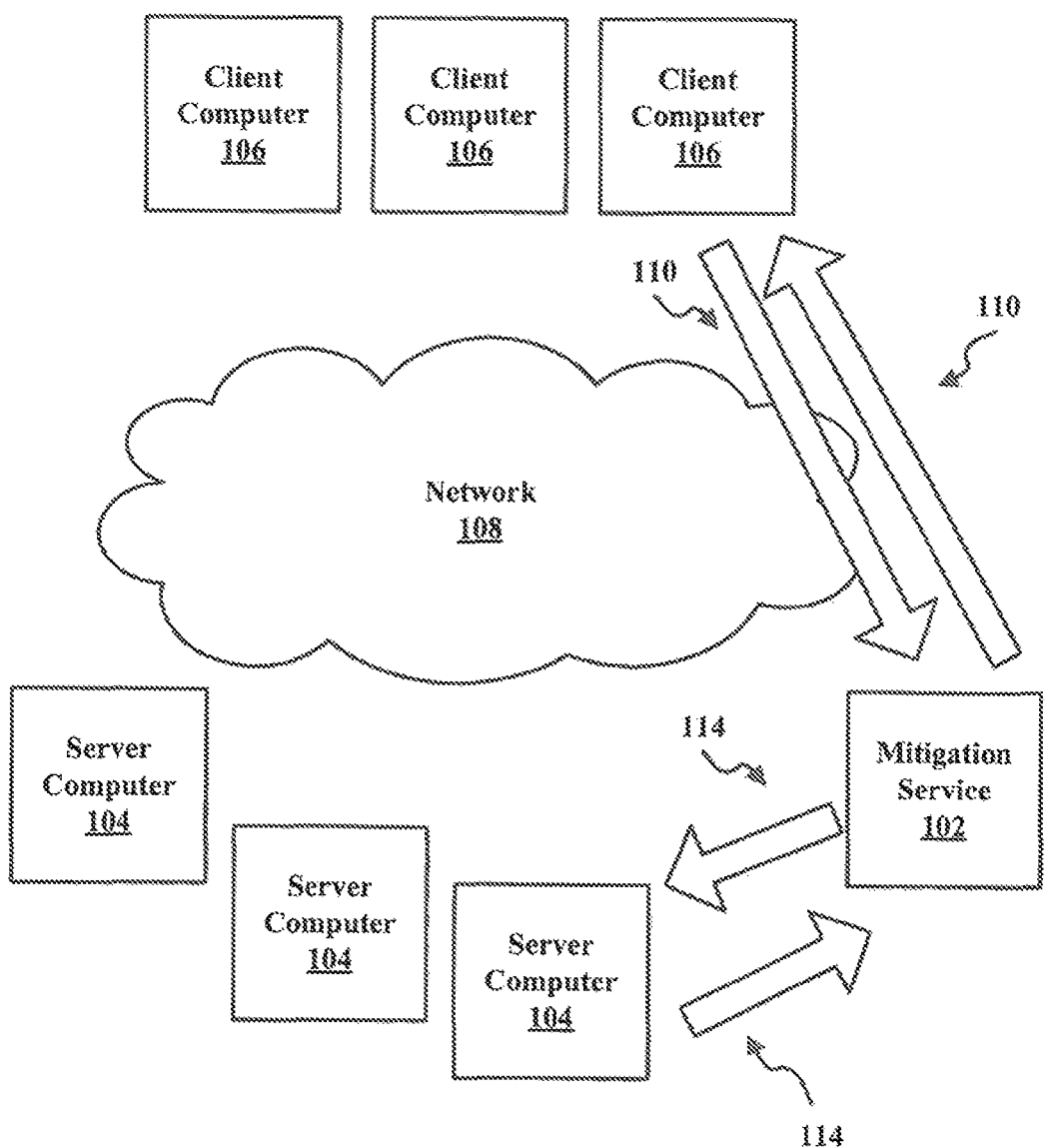
FIG. 8 is a generic block diagram of an environment in which a mitigation service can monitor network traffic in two directions, according to various implementations.

For example, as illustrated in FIG. 8, the mitigation service 102 can switch to monitoring traffic in both direction between the client computers 106 and the server computer 104. In other words, the mitigation service 102 can operate as a proxy between the client computers 106 and the network computers 104. As such, the mitigation service 102 can communicate with the client computers 106 with traffic 110 and communicate with the server computers 104 with traffic 114. The mitigation service 102 can operate as a proxy as long as necessary to mitigate the attack. Additionally, the mitigation service 102 can operate as a proxy for a predetermined amount of time.

When operating as a proxy, the mitigation service 102 can utilize other methods for monitoring network traffic such as SYN cookies. In this method, a mitigation system 102 can send synchronization-acknowledgment (SYN-ACK) packets on behalf of the server computers 104 that it is protecting in response to SYN packets from the client computers 106. The mitigation system 102 can propose, an initial SYN sequence number that is representative of the connection state. If the client computers 106 respond with an ACK packet, the connection is validated by regenerating the initial state and by decompressing the acknowledgment (ACK) packet. The mitigation system 102 can then open a TCP network connection to the server computers 104. The mitigation system 102 can translate the sequence number between the two connections as the initial sequence numbers proposed by the mitigation system 102 to the client computers 106 will be different from that proposed by the server computers 104 to the mitigation system 102. Additionally, the mitigation server 102 uses its network address when communicating with the server computers 104.

Figure 9:
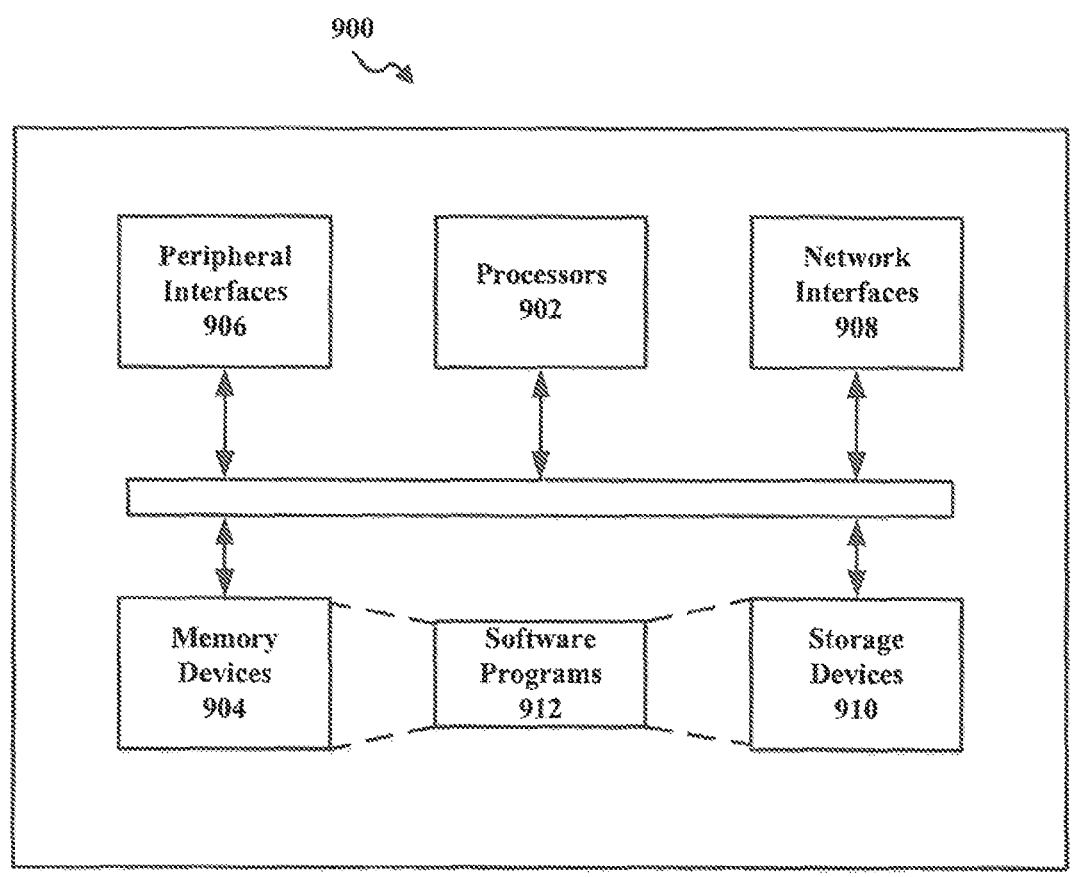
FIG. 9 is a generic block diagram of an example of components of a computer system, according to various implementations.

FIG. 9 is a diagram depicting an example of a hardware configuration for a computer system 900, such as a computer storing and executing the mitigation service 102, the server computers 104, or the client computers 106, that can be used to perform one or more of the processes described above. While FIG. 9 illustrates various components contained in the computer system 900, FIG. 9 illustrates one example of a computer system and that additional components can be added and existing components can be removed.

As illustrated in FIG. 9, the computer system 900 can include one or more processors 902 of varying core configurations and clock frequencies. The computer system 900 can also include one or more memory devices 904 that serve as a main memory during the operation of the computer system 900. The computer system 900 can also include one or more peripheral interfaces 906, such as keyboards, mice, touchpads, computer screens, touchscreens, etc., for enabling human interaction with and manipulation of the computer system 900.

The computer system 900 can also include one or more network interfaces 908 for communicating via one or more networks, such as Ethernet adapters, wireless transceivers, or serial network components, for communicating over wired or wireless media using protocols, such as Ethernet, wireless Ethernet, Global System for Mobile Communications (GSM), Enhanced Data rates for GSM Evolution (EDGE), Universal Mobile Telecommunications System (UMTS), Worldwide interoperability for Microwave Access (WiMAX), Long Term Evolution (LTE), etc. The computer system 900 can also include one or more storage device 910 of varying physical dimensions and storage capacities, such as flash drives, hard drives, random access memory, etc., for storing data, such as images, files, and program instructions for execution by the one or more processors 902.

Additionally, the computer system 900 can include one or more software programs 912, such as the mitigation service 102. The one or more software programs 912 can include instructions that cause the one or more processors 902 to perform the processes described. The one or more software programs 912 can be stored in the one or more memory devices 904 and/or on in the one or more storage devices 910. Likewise, the data, for example, the hash table and the stored parameters, utilized by one or more software programs 912 can be stored in the one or more memory devices 904 and/or on in the one or more storage devices 910.

In implementations, the components of the computer system 900 need not be enclosed within a single enclosure or even located in close proximity to one another. Those skilled in the art will appreciate that the above-described componentry are examples only, as the computer system 900 can include any type of hardware componentry, including any necessary accompanying firmware or software, for performing the disclosed embodiments. The computer system 900 can also be implemented in part or in whole by electronic circuit components or processors, such as application-specific integrated circuits (ASICs) or field-programmable gate arrays (FPGAs).

Certain implementations described above can be performed as a computer applications or programs. The computer program can exist in a variety of forms both active and inactive. For example, the computer program can exist as one or more software programs, software modules, or both that can be comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Examples of computer readable storage devices and media include conventional computer system RAM (random access memory), ROM (read-only memory), EPROM (erasable, programmable ROM), EEPROM (electrically erasable, programmable ROM), and magnetic or optical, disks or tapes. Examples of computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings have been described with reference to examples of the implementations thereof, those skilled in the art will, be able to make various modifications to the described implementations without departing from the true spirit and scope. The terms and descriptions used herein are set forth, by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising,". As used herein, the terms "one or more of" and "at least one of" with respect to a listing of items such as for example, A and B, means A alone, B alone, or A and B. Further, unless specified otherwise, the term "set" should be interpreted as "one or more." Those skilled, in the art will recognize that these and other variations are possible within the spirit and scope as defined in the following claims and their equivalents.

What is claimed is:

1. A computer-implemented method for monitoring network connections by a mitigation service, the mitigation service monitoring network traffic in one direction between a client computer and a server computer, the method comprising:
    receiving, from the client computer, a connection request that is configured to establish a network connection between the client computer and the server computer, wherein the connection request comprises at least one parameter corresponding to the network connection;
    sending, to the client computer in response to the connection request, a single response that is configured to cause a reply by the client computer, wherein the single response comprises a single packet with an acknowledgement sequence number that is the same as a sequence number received in the connection request and wherein the acknowledgement sequence number does not interrupt the establishment of the network connection between the client computer and the server computer and does not complete the establishment of the network connection between the client computer and the server computer;
    determining whether the reply is received from the client computer; and
    in response to determining that the reply is received from the client computer:
    sending the connection request to the server computer without altering an identification of the client computer in the request.

2. The method of claim 1, the method further comprising:
    comparing the at least one parameter corresponding to the connection request to at least one parameter of the reply; and
    determining whether the reply is received form the client computer based on the comparison.

3. The method of claim 2, wherein sending the connection request to the server computer comprises generating a new connection request based on the at least one parameter corresponding to the connection request.

4. The method of claim 1, the method further comprising:
    storing, in response to determining that the reply is received from the client computer, a network address corresponding to the client computer and at least one parameter corresponding to the reply;
    receiving a retransmitted connection request corresponding to a network address, wherein the retransmitted connection request comprises at least one parameter;
    comparing the network address and the at least one parameter corresponding to the retransmitted connection request respectively to the network address corresponding to the client computer and the at least one parameter corresponding to the reply; and in response to the network address and the at least one parameter corresponding to the retransmitted connection request respectively matching the network address corresponding to the client computer and the at least one parameter corresponding to the reply:
sending the retransmitted connection request to the server computer.

5. The method of claim 1, the method further comprising:
determining that a number of connection requests from the client computer exceeds a predetermined threshold; and
in response to determining that the number of connection requests exceeds the predetermined threshold:
monitoring network traffic in both directions between the client computer and the server computer.

6. The method of claim 5, wherein monitoring the network traffic in both directions comprises:
replacing, in future connection requests, the network address corresponding to the client computer with the network address corresponding the mitigation service.

7. A computer-implemented method for monitoring network traffic by a mitigation service, the mitigation service monitoring network traffic in one direction between a client computer and a server computer, the method comprising:
receiving, from the client computer, a TCP synchronization (SYN) packet that is configured to establish a TCP connection with the server computer, wherein the TCP SYN packet comprises one or more parameters corresponding to the TCP connection;
determining a network address corresponding to the client computer;
sending, to the client computer, a single TCP acknowledgement (ACK) packet, wherein the TCP ACK comprises a sequence number that is the same as a sequence number corresponding to the TCP SYN packet to initiate a reply by the client computer without interrupting the establishment of the TCP connection with the server computer and does not complete the establishment of the TCP connection between the client computer and the server computer;
receiving a TCP reset (RST) packet, wherein the TCP RST packet comprises one or more parameters;
determining an origination network address corresponding to the TCP RST packet;
comparing the origination network address and at least one of the one or more parameters of the TCP RST packet respectively to the network address corresponding to the client computer and at least one of the parameters corresponding to the TCP connection of the TCP SYN packet;
determining whether the TCP RST packet originated from the client computer based on the comparison; and
in response to determining that the TCP RST packet originated from the client computer:
sending the TCP SYN packet to the server computer without altering an identification of the client computer in the TCP SYN.

8. The method of claim 7, wherein the one or more parameters corresponding to the TCP connection of the TCP SYN packet comprise the sequence number and a time to live.

9. The method of claim 7, the method further comprising:
storing the network address corresponding to the client computer; and
storing at least one of the one or more parameters from the TCP SYN packet corresponding to the TCP connection.

10. The method of claim 9, the method further comprising:
generating, in response to determining that the TCP RST packet originated from the client computer, a new TCP SYN packet based on the at least one of the one or more parameters that was stored; and
sending the new TCP SYN packet to the server computer as the TCP SYN packet.

11. The method of claim 7, the method further comprising:
determining that a number of TCP SYN packets from the client computer exceeds a predetermined threshold; and
in response to determining that the number of TCP SYN packets exceeds the predetermined threshold:
monitoring network traffic in both directions between the client computer and the server computer.

12. The method of claim 11, wherein monitoring the network traffic in both directions comprises:
replacing, in future connection requests, the network address corresponding to the client computer with the network address corresponding the mitigation service.

13. A computer-implemented method for monitoring network traffic by a mitigation service, the mitigation service monitoring network traffic in one direction between a client computer and a server computer, the method comprising:
receiving, from the client computer, a TCP synchronization (SYN) packet that is configured to establish a TCP connection with the server computer, wherein the TCP SYN packet comprises one or more parameters corresponding to the TCP connection;
determining a network address corresponding to the client computer that sent the TCP SYN packet;
sending, to the client computer, a single TCP acknowledgement (ACK) packet, wherein the TCP ACK comprises a sequence number that is the same as a sequence number corresponding to the TCP SYN packet to initiate a reply by the client computer without interrupting the establishment of the TCP connection with the server computer and does not complete the establishment of the TCP connection between the client computer and the server computer;
determining whether a TCP reset (RST) packet is received from the client computer, wherein the TCP RST packet comprises one or more parameters; and
in response to determining that a TCP RST packet is received:
allowing the network traffic in the one direction between the client computer and the server computer.

14. The method of claim 13, the method further comprising:
storing, in response to determining that the TCP RST packet originated from the client computer, the network address corresponding to the client computer and the one or more parameters corresponding to the TCP RST packet;
receiving a retransmitted TCP SYN packet corresponding to a network address, wherein the retransmitted TCP SYN packet comprises one or more parameters;
comparing the network address corresponding to the retransmitted TCP SYN packet and the one or more parameters corresponding to the retransmitted TCP SYN packet respectively to the network address corresponding to the client computer and the one or more parameters corresponding to the TCP RST packet; and
in response to the network address corresponding to the retransmitted TCP SYN packet and the one or more parameters corresponding to the retransmitted TCP SYN packet respectively matching the network address corresponding to the client computer and the one or more parameters corresponding to the TCP RST packet:
sending the retransmitted TCP SYN packet to the server computer.

15. The method of claim 14, the method further comprising:
receiving a new TCP SYN packet corresponding to a network address, wherein the new TCP SYN packet comprises one or more parameters;
comparing the network address corresponding to the new TCP SYN packet and the one or more parameters corresponding to the new TCP SYN packet respectively to the network address corresponding to the client computer and the one or more parameters corresponding to the TCP RST packet; and
in response to the network address corresponding to the new TCP SYN packet and the one or more parameters corresponding to the new TCP SYN packet respectively matching the network address corresponding to the client computer and the one or more parameters corresponding to the TCP RST packet:
sending the new TCP SYN packet to the server computer.

16. The method of claim 13, the method further comprising:
determining that a number of TCP SYN packets from the client computer exceeds a predetermined threshold; and
in response to determining that the number of TCP SYN packets exceeds the predetermined threshold:
monitoring network traffic in both directions between the client computer and the server computer.

17. The method of claim 16, wherein monitoring the network traffic in both directions comprises:
replacing, in future connection requests, the network address corresponding the client computer with the network address corresponding the mitigation service.

18. A computer readable storage medium comprising instructions that cause one or more processors to perform a method for monitoring network connections by a mitigation service, the mitigation service monitoring network traffic in one direction between a client computer and a server computer, the method comprising:
receiving, from the client computer, a connection request that is configured to establish a network connection between the client computer and the server computer, wherein the connection request comprises at least one parameter corresponding to the network connection;
sending, to the client computer in response to the connection request, a single response that is configured to cause a reply by the client computer, wherein the single response comprises a single packet with an acknowledgement sequence number that is the same as a sequence number received in the connection request and wherein the acknowledgement sequence number does not interrupt the establishment of the network connection between the client computer and the server computer and does not complete the establishment of the network connection between the client computer and the server computer;
determining whether the reply is received from the client computer; and
in response to determining that the reply is received from the client computer:
sending the connection request to the server computer without altering an identification of the client computer in the request.

19. The computer readable storage medium of claim 18, the method further comprising:
comparing the at least one parameter corresponding to the connection request to at least one parameter of the reply; and
determining whether the reply is received form the client computer based on the comparison.

20. The computer readable storage medium of claim 19, wherein sending the connection request to the server computer comprises generating a new connection request based on the at least one parameter of the connection request.

21. The computer readable storage medium of claim 18, the method further comprising:
storing, in response to determining that the reply is received from the client computer, a network address corresponding to the client computer and at least one parameter corresponding to the reply;
receiving a retransmitted connection request corresponding to a network address, wherein the retransmitted connection request comprises at least one parameter;
comparing the network address and the at least one parameter corresponding to the retransmitted connection request respectively to the network address corresponding to the client computer and the at least one parameter corresponding to the reply; and
in response to the network address and the at least one parameter corresponding to the retransmitted connection request respectively matching the network address corresponding to the client computer and the at least one parameter corresponding to the reply:
sending the retransmitted connection request to the server computer.

22. A system for monitoring network traffic in one direction between a client computer and a server computer, comprising:
one or more memory devices storing instructions; and
one or more processors coupled to the memory devices and configured to execute the instructions to perform a method comprising:
receiving, from the client computer, a connection request that is configured to establish a network connection between the client computer and the server computer, wherein the connection request comprises at least one parameter corresponding to the network connection;
sending, to the client computer in response to the connection request, a single response that is configured to cause a reply by the client computer, wherein the single response comprises a single packet with an acknowledgement sequence number that is the same as a sequence number received in the connection request and wherein the acknowledgement sequence number does not interrupt the establishment of the network connection between the client computer and the server computer and does not complete the establishment of the network connection between the client computer and the server computer;
determining whether the reply is received from the client computer; and
in response to determining that the reply is received from the client computer:
sending the connection request to the server computer without altering an identification of the client computer in the request.

23. The system of claim 22, wherein the one or more processors are configured to execute the instructions to perform the method further comprising:
comparing the at least one parameter corresponding to the connection request to at least one parameter of the reply; and
determining whether the reply is received form the client computer based on the comparison.

24. The system of claim 23, wherein sending the connection request to the server computer comprises generating a new connection request based on the at least one parameter of the connection request.

25. The system of claim 22, wherein the one or more processors are configured to execute the instructions to perform the method further comprising:
- storing, in response to determining that the reply is received from the client computer, a network address corresponding to the client computer and at least one parameter corresponding to the reply;
- receiving a retransmitted connection request corresponding to a network address, wherein the retransmitted connection request comprises at least one parameter;
- comparing the network address and the at least one parameter corresponding to the retransmitted connection request respectively to the network address corresponding to the client computer and the at least one parameter corresponding to the reply; and
- in response the network address and the at least one parameter corresponding to the retransmitted connection request respectively matching the network address corresponding to the client computer and the at least one parameter corresponding to the reply:
  - sending the retransmitted connection request to the server computer.

* * * * *